United States Patent [19]

Pyman et al.

[11] 4,247,522
[45] Jan. 27, 1981

[54] METHOD OF PURIFYING URANIUM TETRAFLUORIDE HYDRATE AND PREPARING URANIUM (VI) PEROXIDE HYDRATE USING A FLUORIDE PRECIPITATING AGENT

[75] Inventors: Ronald L. Pyman, Tampa; JoAnne LeFever, Brandon, both of Fla.

[73] Assignee: Gardinier, Inc., Tampa, Fla.

[21] Appl. No.: 919,557

[22] Filed: Jun. 27, 1978

[51] Int. Cl.³ .............................................. C01G 43/01
[52] U.S. Cl. ........................................ 423/8; 423/16; 423/253; 423/260
[58] Field of Search ...................... 423/16, 253, 260, 8

[56] References Cited

U.S. PATENT DOCUMENTS

| | | |
|---|---|---|
| 2,733,127 | 1/1956 | Spiegler ................................. 423/16 |
| 2,847,277 | 8/1958 | King et al. ............................. 423/16 |
| 3,037,840 | 6/1962 | Gregory, Jr. et al. ................. 423/260 |

OTHER PUBLICATIONS

Grainger, L., *Uranium and Thorium*, George Newnes Limited, London, 1958, pp. 31–32.
Bruce, F. et al., Eds., *Progress in Nuclear Chemistry, Series III, Process Chemistry*, Pergammon Press, New York, 1956, p. 20.

*Primary Examiner*—Deborah L. Kyle
*Attorney, Agent, or Firm*—Cushman, Darby & Cushman

[57] ABSTRACT

A method of preparing uranium (VI) peroxide hydrate from uranium tetrafluoride hydrate, comprising the steps of digesting uranium tetrafluoride hydrate in an aqueous acid in the presence of a fluoride precipitating agent to produce an aqueous uranium solution, filtering the aqueous uranium solution to remove precipitated fluorides and undissolved material, adjusting the aqueous uranium solution to a pH between about 1 to about 3, reacting the aqueous uranium solution with peroxide to precipitate uranium (VI) peroxide hydrate, and separating the precipitated uranium (VI) peroxide hydrate.

24 Claims, 2 Drawing Figures

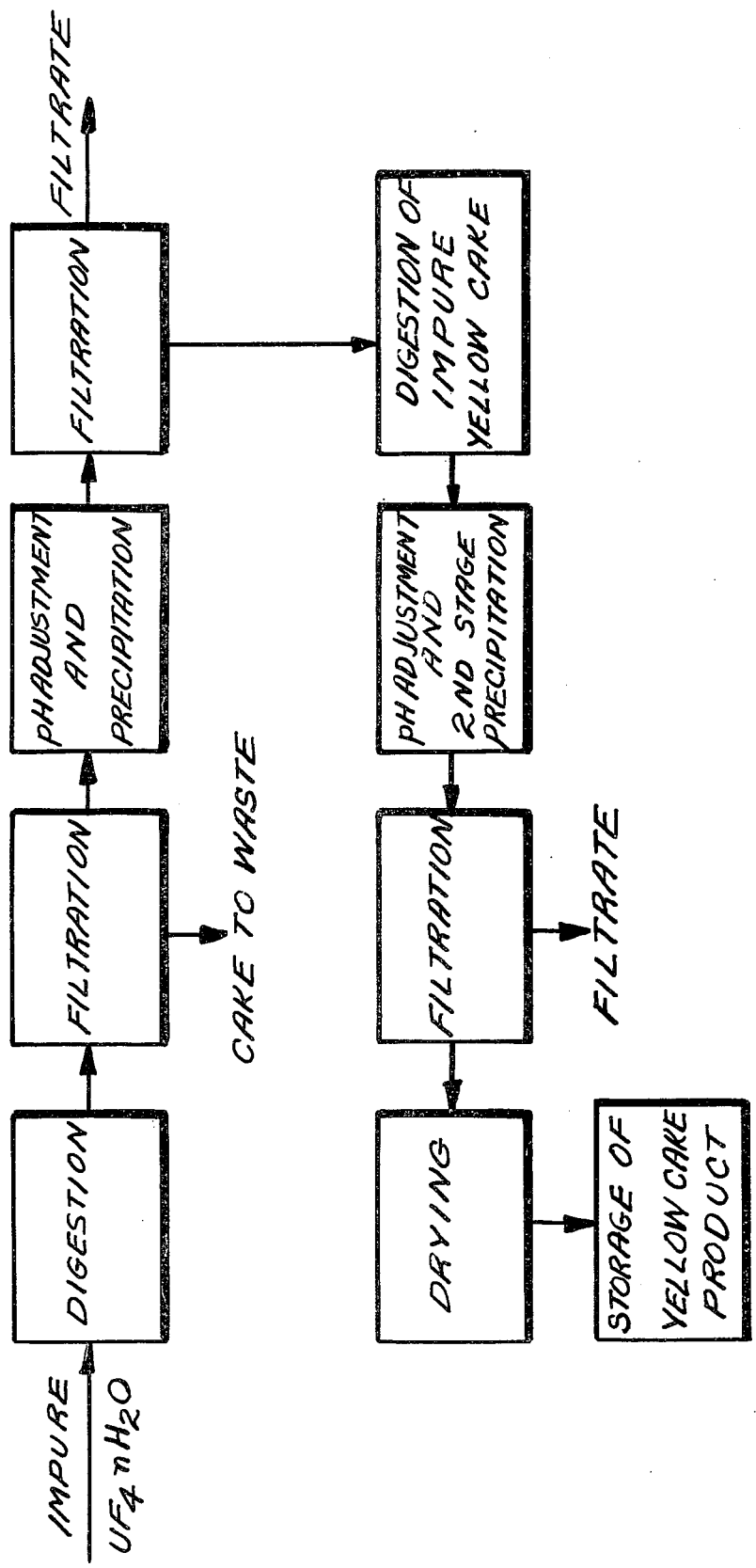

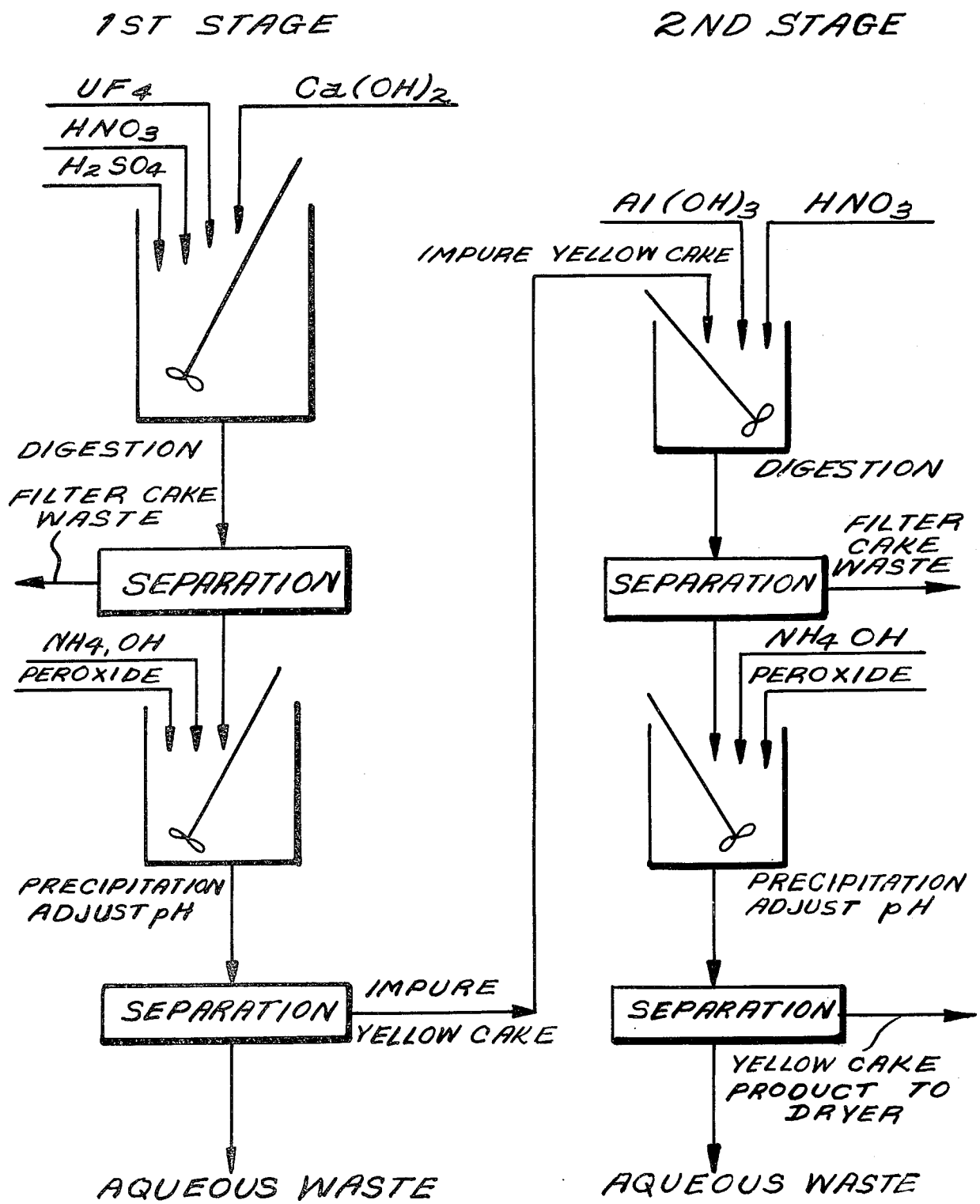

METHOD OF PURIFYING URANIUM TETRAFLUORIDE HYDRATE AND PREPARING URANIUM (VI) PEROXIDE HYDRATE USING A FLUORIDE PRECIPITATING AGENT

BACKGROUND OF THE INVENTION

The recovery of uranium from wet-process phosphoric acid has been the subject of prior study. Most marine phosphate rock contains from about 0.2 to 0.4 pounds of uranium per ton. Thus, the annual production of phosphate rock, on the order of about 30–40 million tons yearly, represents several million pounds of uranium. In the United States, both the Florida and Carolina phosphate deposits contain appreciable uranium.

In the wet process for producing phosphoric acid, phosphate rock is treated with sulfuric acid, thereby precipitating calcium sulfate and releasing phosphoric acid. It has been found that nearly all of the uranium contained in the phosphate rock is dissolved by sulfuric acid, and that the filtrate of the crude phosphoric acid contains from about 70% to about 90% of the uranium in the original phosphate rock.

To recover the minute uranium content of the crude wet-process phosphoric acid required special processing techniques. These techniques are generally described in the *Kirk-Othmer Encyclopedia of Chemical Technology, Second Edition*, volume 21, pages 1 to 36, which are hereby incorporated by reference. One technique for recovering uranium from crude wet-process phosphoric acid is solvent extraction. Recovery of uranium from crude phosphoric acid by solvent extraction requires a solvent which is immiscible with water and which has a high affinity for uranium. These solvents extract uranium from crude phosphoric acid by the formation of a complex with the uranium which is soluble in excess solvent.

After separation of the uranium-laden or "pregnant" solvent from the phosphoric acid, the solvent is contacted with hydrofluoric acid to precipitate the uranium in the form of impure uranium tetrafluoride hydrate, $UF_4 \cdot n\, H_2O$, which is removed from the solvent-hydrofluoric acid mixture by means of a centrifuge. Because of its impurity content, the resulting $UF_4 \cdot n\, H_2O$ is not suitable for direct conversion to $UF_6$ and must be first purified to produce a uranium product meeting "yellow cake" standards.

Prior processes to purify uranium tetrafluoride hydrate, $UF_4 \cdot n\, H_2O$, include for example, digestion of the crude uranium tetrafluoride hydrate in hot concentrated sodium hydroxide solution, followed by filtration and washing. It has been found that in order to consistently meet the standards of purity required for the production of "yellow cake" a large excess of sodium hydroxide or multiple digestions are required to digest the uranium tetrafluoride in the initial step of the process. In addition, filtration of the solution after digestion in concentrated sodium hydroxide is difficult and requires considerable filter area. This increases the cost of equipment and the operating cost of the described process.

The present invention provides a new process of purifying uranium tetrafluoride hydrate to produce a uranium (VI) peroxide product meeting "yellow cake" specifications which is economically attractive, especially when compared to the prior art process described above. Yellow cake specifications are issued by uranium refineries and specify the maximum impurity levels which a refinery will accept in their refinery feedstock. For example, yellow cake specifications issued by the Kerr-McGee refinery specify a maximum fluoride level of 0.15% based on the weight of the uranium. Maximum levels of other impurities, based on the weight of uranium in the feedstock, include calcium, 1.00%.

SUMMARY OF THE INVENTION

Briefly, in accordance with the invention, a process of purifying uranium tetrafluoride hydrate to produce a uranium (VI) peroxide product meeting "yellow cake" standards has been found using a double precipitation procedure, after digestion in an acid medium in the presence of a fluoride precipitating agent. In the process of the invention, uranium tetrafluoride hydrate is first digested in acid solution together with a fluoride precipitating agent to produce an aqueous uranium solution. The aqueous uranium solution is filtered to remove the precipitated fluoride and any undissolved non-uranium material. The pH of the aqueous uranium solution is raised to about 1 to about 3, and then treated with hydrogen peroxide to precipitate uranium (VI) peroxide, which is separated by filtration or centrifugation. In the second stage of the process the uranium (VI) peroxide of the first stage is digested in an acid solution to which a fluoride complexing agent has been added to produce an aqueous uranium (VI) solution. The pH of the aqueous solution is again adjusted between 1 and 3, and the aqueous uranium (VI) solution is treated with hydrogen peroxide to precipitate uranium (VI) peroxide, which is again separated by filtration or centrifugation, and dried. It is found that the uranium (VI) peroxide obtained from the second stage of the process is sufficiently pure to meet "yellow cake" specifications.

BRIEF DESCRIPTION OF THE DRAWING

FIG. 1 and FIG. 2 are flow diagrams of preferred embodiments of the invention.

Impure uranium tetrafluoride hydrate, $UF_4 \cdot H_2O$, is digested in an acid solution containing a fluoride precipitating agent. The precipitated fluoride and any undissolved material is separated from the aqueous uranium solution, e.g., by filtration. The pH of the resulting aqueous uranium solution is adjusted. In the first stage precipitation the aqueous uranium solution is treated with peroxide to precipitate uranium (VI) peroxide. The precipitate is separated, and redigested in an acid solution containing a fluoride complexing agent. The pH of the resulting aqueous uranium solution is adjusted, and uranium (VI) peroxide is again precipitated by the addition of peroxide. The uranium (VI) peroxide product, which meets "yellow cake" specification, is separated, dried and stored.

While the invention will be described in connection with a preferred procedure, it will be understood that it is not intended to limit the invention to that procedure. On the contrary, it is intended to cover all alternatives, modifications and equivalents included within the scope of the invention as defined by the claims.

DETAILED DESCRIPTION OF THE INVENTION

A preferred embodiment of the present invention will be discussed with reference to the drawings. In the first step of the process impure uranium tetrafluoride hydrate is digested in an acid solution in the presence of a fluoride precipitating agent. Nitric acid is preferred for use in this digestion, and for example, 55% to 70% nitric acid may be used. It is desirable that the acid solution be stirred to promote digestion. It is also desirable that the digestion take place at an elevated temperature, e.g., between about 90° and 120° C. It is preferred to use more than a stoichiometric amount of nitric acid with reference to the following unbalanced equation:

$$UF_4 + 2HNO_3 \rightarrow UO_2^{2+} + 2(NO_3^-). \qquad \text{(Equ. 1)}$$

For example, it is preferred to use about 2 to 3 times the stoichiometric amount of nitric acid based on the above equation.

The purpose of the fluoride precipitating agent is to remove fluoride ions from the reaction solution when the uranium tetrafluoride is digested. Any compound which combines with fluoride ions to form an insoluble fluoride compound may be used. For example, alkaline earth compounds which form fluorides which are insoluble in acid solution may be used as the fluoride precipitating agents. Suitable alkaline earth compounds include those alkaline earth compounds which are themselves soluble but which form alkaline earth fluorides which are insoluble in acid solution. Alkaline earth fluorides which are insoluble in acid solution include calcium fluoride, and barium fluoride, although barium fluoride is slightly soluble and therefore not a preferred fluoride precipitate. Preferred fluoride precipitating agents include soluble calcium compounds, such as calcium chloride, calcium nitrate, or calcium oxide or hydroxide. It is preferred to use an excess, i.e., more than stoichiometric amount, of fluoride precipitating agent.

The fluoride precipitating agent selected to remove fluoride from the reaction solution in the first step of purification must be chosen with due regard to its possible effect on the subsequent purity of the uranium (VI) peroxide. For example, when using an excess of an alkaline earth compound it is necessary to remove the remaining alkaline earth cations before precipitating uranium (VI) peroxide. Large concentrations of alkaline earth cations in the aqueous uranium solution would otherwise co-precipitate with the uranium (VI) peroxide. A reagent which forms an insoluble alkaline earth compound is used to remove the remaining alkaline earth cations. For example, if a calcium compound is used as a fluoride precipitating agent, a preferred reagent to remove remaining calcium cations is sulfuric acid, which forms insoluble calcium sulfate. For example, a stoichiometric amount of sulfuric acid may be added to the aqueous uranium solution to precipitate the remaining calcium cations after the fluoride is precipitated.

The slurry containing the fluoride precipitate, the precipitate of the remaining alkaline earth cations, and any undissolved material is cooled to less than 40° C. and separated into its solid and liquid components, for example by filtration. The separated solids, viz, the precipitated fluoride and alkaline earth cations, and any undissolved material, are washed with a small amount of water which is added to the separated liquid, viz, the filtrate. Thereafter the separated solids are discarded.

In the next step of the process, the pH is increased to between about 1 and about 3. As used in the present specification, a pH of about 1 to about 3 includes a pH from 0.5 to a pH of 3.5. It is preferred to increase the pH of the cooled reaction solution to about 2. For example, ammonium hydroxide may be used to raise the pH of the aqueous uranium solution.

The aqueous uranium solution is then treated with peroxide to precipitate uranium (VI) peroxide, while at the same time maintaining the pH. Hydrogen peroxide is a preferred peroxide for use in the present invention. It is preferred to use an excess amount of hydrogen peroxide, for example about twice the stoichiometric amount of hydrogen peroxide based on the following equation:

$$UO_2^{2+} + 1\,H_2O_2 + 2\,H_2O \rightarrow UO_4.2H_2O + 2H^+. \qquad \text{(Equ. 2)}$$

The aqueous uranium solution is stirred during and after the addition of the peroxide to ensure full precipitation of uranium (VI) peroxide. For example, the aqueous uranium solution may be stirred for one hour after the addition of the peroxide to ensure full precipitation.

The reaction mixture is then separated, for example by filtering or centrifuging, and the yellow uranium (VI) peroxide percipitate is washed with water. The yellow uranium (VI) peroxide precipitate is commonly called "yellow cake" when it meets established standards of purity. The filtrate from the separation is discarded. The wet uranium (VI) peroxide filter cake generally contains approximately 0.5% to approximately 1.0% by weight fluoride.

In most cases, the wet uranium (VI) peroxide filter cake goes to a second stage of purification. However, it is an aspect of the present invention that depending upon the type, and amount, of impurities present in the uranium tetrafluoride hydrate starting material, the second purification steps may be omitted. That is, depending upon the type, and amount, of impurities present in the starting material, the uranium (VI) peroxide product of the first purification stage may meet "yellow cake" specifications, and be used without further purification.

The second stage of purification is necessary only if the uranium (VI) peroxide product of the first stage does not meet "yellow cake" specifications. It is also contemplated within the scope of the present invention that a uranium (VI) peroxide product which does not meet "yellow cake" specifications from another source, i.e., not processed according to the first purification stage described above, can be purified to meet "yellow cake" specifications by the process of the second stage which is now described. In the second stage, the wet uranium (VI) peroxide product of the first stage, or from another source, is dissolved in an acid mixture in the presence of a fluoride complexing agent. The digestion again desirably takes place with stirring at an elevated temperature. In the digestion step of the second stage of purification it is again preferred that the acid used be nitric acid, containing for example 55% to 70% by weight $HNO_3$. The fluoride complexing agent may be chosen from any compound which forms a soluble fluoride complex. The purpose of the fluoride complexing agent is to complex and scavenger the fluoride ions in the reaction solution when the uranium (VI) peroxide product of the first stage is dissolved. For example, aluminum compounds capable of forming a soluble aluminum fluoride complex, e.g., $AlF_6^{3-}$, in acid solution may be used as the fluoride complexing agent. Suitable aluminum compounds include aluminum chloride, aluminum nitrate, aluminum oxide or hydroxide, and aluminum sulfate. Of these aluminum hydroxide is a preferred fluoride complexing agent. Boron compounds capable of forming soluble boron fluoride complexes in acid solution may also be used as the fluoride complexing agent. Suitable boron compounds include, for example, boric acid.

In this second stage of purification, it is desirable that the acid used to digest the uranium (VI) peroxide be present in excess. For example, if nitric acid is used preferably at least twice the stoichiometric amount needed to form uranyl nitrate, $UO_2(NO_3)$, is present. It is also preferred to use an excess of fluoride complexing agent. Indeed, a large excess of fluoride complexing agent is preferred. For example, it is possible to use at least 8 times as much fluoride complexing agent as the stoichiometric amount necessary to complex the fluoride ions remaining in the reaction mixture. Furthermore, because the fluoride ion concentration in the reaction mixture in the second stage of purification is far less than the first stage, even 8 times the stoichiometric amount of fluoride complexing agent does not interfere with the subsequent precipitation of uranium (VI) peroxide. In the first stage of purification the fluoride ion level of the uranium tetrafluoride hydrate to be digested is in the range from about 20% to about 25% by weight. In sharp contrast, the fluoride ion level of the impure uranium peroxide to be digested in the second stage of purification is only about 1% by weight. At these low concentrations of fluoride ion, even an eightfold excess of aluminum sulfate will not introduce objectionally large amounts of fluoride complexing agent into the reaction mixture. Therefore, in the second stage of purification it is not necessary to remove excess fluoride complexing agent from the aqueous uranium solution following digestion.

After the uranium (VI) peroxide is digested in the acid solution in the presence of a fluoride complexing agent, the solution is cooled, preferably below 40° C. and any undissolved solids are separated from the reaction solution, for example by filtering or centrifuging. The pH is raised with an alkaline reagent to between about 1 and about 3. A preferred alkaline reagent used to raise the pH of the reaction solution is ammonium hydroxide.

Thereafter, the aqueous uranium solution is treated with an excess of peroxide, with stirring, while maintaining the pH of the solution between about 1 and about 3. A preferred peroxide is hydrogen peroxide. It is desirable to use about twice the stoichiometric amount of hydrogen peroxide required according to Equation 2 to form the uranium (VI) peroxide precipitate. The resulting slurry is agitated for at least one hour to ensure full precipitation of uranium (VI) peroxide. The reaction mixture is then filtered or centrifuged, and the filter cake, which constitutes the purified product, is washed with a small amount of water and dried. The filtrate, together with the wash water, may be recovered and used as dilution water in the first stage of the purification process. It is found that the purified "yellow cake" product contains between about 97% and about 99% by weight of the uranium in the original starting material.

EXAMPLE

In the first stage of purification, impure uranium tetrafluoride hydrate was mixed with a calcium hydroxide slurry at a temperature of 105° C. by stirring the reactants together for approximately 10 minutes. Nitric acid was added to the slurry at 105° C. and the entire mixture was stirred for 15 minutes. Three times the stoichiometric amount of nitric acid necessary to form uranyl nitrate was used for the digestion. The amount of calcium hydroxide used was two times the stoichiometric amount necessary to precipitate the fluoride in the starting material as $CaF_2$. Next, the excess calcium cations contained in the solution were precipitated as calcium sulfate by adding a stoichiometric amount of sulfuric acid.

The resulting slurry was diluted with water to aid filtration. The slurry was then cooled to less than 40° C. and filtered to remove the precipitated calcium sulfate and calcium fluoride, along with any undissolved materials, and the filter cake was washed with a small amount of water; the washed water being combined with the filtrate. The filter cake was then discarded. The pH of the uranyl nitrate solution was raised to pH 2 by the addition of ammonium hydroxide.

The uranium-containing filtrate and wash water solution, now at pH 2.0, were combined in a stirred vessel with twice the stoichiometric amount of hydrogen peroxide needed to form uranium (VI) peroxide while maintaining the pH at 2 by the addition of ammonium hydroxide. The reaction mixture was stirred for more than an hour after all of the hydrogen peroxide had been added to ensure full precipitation of uranium (VI) peroxide, and then filtered.

The filtrate from the above filtration was discarded and the wet uranium (VI) peroxide filter cake was subjected to the second stage of purification. It was found that the wet uranium (VI) peroxide filter cake contained approximately 0.5 to 1.0% fluoride.

In the second stage of purification, the wet uranium (VI) peroxide filter cake was dissolved in a mixture of 55% nitric acid and aluminum hydroxide at a temperature of 105° C. The reaction mixture was stirred for approximately 15 minutes. Twice the stoichiometric amount of nitric acid needed to form uranyl nitrate was used, while the amount of aluminum hydroxide was eight times the stoichiometric amount needed to complex the fluoride in the uranium (VI) peroxide as $AlF_6^{3-}$.

After the uranium (VI) peroxide filter cake was dissolved in the acid solution, the solution was cooled to below 40° C. and filtered. The filter cake was discarded and the uranyl nitrate solution adjusted to pH 2 by the addition of ammonium hydroxide. As in the first stage, the uranium was precipitated from this solution by adding twice the stoichiometric amount of hydrogen peroxide needed to ensure full precipitation of the uranium as uranium (VI) peroxide, while maintaining the solution at pH 2 by the addition of ammonium hydroxide.

The resulting slurry was agitated for over one hour, filtered and the filter cake, which was the purified "yellow cake" product, was dried at 105° C. for about two hours. The filtrate was collected for use as dilution water in the first stage of the purification process. It was found that the uranium in the purified "yellow cake" product constituted 97% to 98% of the uranium in the original uranium tetrafluoride hydrate starting material.

Using the procedure set forth above, this Example was repeated three times. The purified uranium (VI) peroxide product of each of these examples was analyzed and found to contain by weight:

|  | Percent | | | | | | Yield for U |
| --- | --- | --- | --- | --- | --- | --- | --- |
|  | U | F | Al | Ca | Fe | Mg |  |
| Uranium Tetrafluoride Hydrate | 13.40 | 18.26 | 0.32 | 0.13 | 0.69 | 0.03 |  |
| Purified | 64.92 | 0.02 | 0.03 | 0.06 | 0.71 | 0.0 | 98.4 |
| Uranium (VI) | 65.29 | 0.09 | 0.20 | 0.09 | 1.42 | 0.0 | 98.4 |
| Peroxide | 67.58 | 0.01 | 0.02 | 0.01 | 0.53 | 0.0 | 97.8 |
| Product | 63.45 | 0.01 | 0.38 | 0.02 | 1.62 | 0.01 | 97.1 |

Each of these products was found to satisfy the "yellow cake" standards of, for example, the Kerr-McGee Corporation, which are set forth below:

| SPECIFICATION LIMITS FOR YELLOW CAKE URANIUM (VI) PEROXIDE HYDRATE | | | |
| --- | --- | --- | --- |
| Minimum | Maximum % Impurities - U-Basis | | |
| % U | F | Al | Ca |
| Kerr-McGee 62.5 | 0.15 | — | 1.00 |

Thus, it is apparent that there has been provided in accordance with the invention, a method of purifying uranium tetrafluoride hydrate that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

We claim:

1. A method of preparing uranium (VI) peroxide hydrate from uranium tetrafluoride hydrate, comprising the steps of:
   (a) digesting uranium tetrafluoride hydrate in an aqueous acid in the presence of a fluoride precipitating agent to precipitate fluoride ions and produce an aqueous uranium solution,
   (b) filtering the aqueous uranium solution of step (a) to remove precipitated fluorides and undissolved material,
   (c) adjusting the aqueous uranium solution of step (b) to a pH between 1 and 3,
   (d) reacting the aqueous uranium solution of step (c) with peroxide to precipitate uranium (VI) peroxide hydrate,
   (e) separating the precipitated uranium (VI) peroxide hydrate of step (d),
   (f) digesting the uranium (VI) peroxide hydrate of step (e) in an aqueous acid in the presence of a fluoride complexing agent to produce an aqueous uranium solution,
   (g) adjusting the aqueous uranium solution of step (f) to a pH between about 1 to about 3,
   (h) reacting the aqueous uranium solution of step (g) with peroxide to precipitate uranium (VI) peroxide hydrate, and
   (i) separating the precipitated uranium (VI) peroxide hydrate of step (h).

2. A method according to claim 1 wherein the aqueous acid is nitric acid.

3. A method according to claim 2, wherein said nitric acid is 55% to 70% nitric acid and wherein about 2 to about 3 times the stoichiometric amount of nitric acid is used in said digesting step (a) based on the following equation:

$$UF_4 + 2HNO_3 \rightarrow UO_2^{2+} 2(NO_3^-).$$

4. A method according to claim 1 wherein the fluoride precipitating agent is a calcium compound.

5. A method according to claim 1 wherein the peroxide is hydrogen peroxide.

6. A method according to claim 1 including maintaining the aqueous uranium solution at a pH between about 1 to about 3 during the reaction of step (d) and the reaction of step (h).

7. The method according to claim 1 wherein the fluoride complexing agent is an aluminum compound.

8. A method according to claim 1 including filtering said aqueous uranium solution of step (f) to remove undissolved material prior to adjusting the pH of said solution in step (g).

9. A method of preparing uranium (VI) peroxide hydrate from uranium tetrafluoride hydrate, comprising the steps of:
   (a) digesting uranium tetrafluoride hydrate in an aqueous acid in the presence of a fluoride precipitating agent to precipitate fluoride ions and produce an aqueous uranium solution,
   (b) filtering the aqueous uranium solution of step (a) to remove precipitated fluorides and undissolved material,
   (c) adjusting the aqueous uranium solution of step (b) to a pH between about 1 to about 3,
   (d) reacting the aqueous uranium solution of step (c) with peroxide to precipitate uranium (VI) peroxide hydrate, and
   (e) separating the precipitated uranium (VI) peroxide hydrate of step (d).

10. A method according to claim 9 wherein the aqueous acid is nitric acid.

11. A method according to claim 9 wherein the fluoride precipitating agent is a calcium compound.

12. A method according to claim 9 wherein the peroxide is hydrogen peroxide.

13. A method according to claim 9 including maintaining the aqueous uranium solution at a pH between about 1 to about 3 during the filtration of step (b) and the reaction of step (d).

14. A method of purifying uranium (VI) peroxide hydrate, comprising the steps of:
   (a) digesting uranium (VI) peroxide hydrate concentrate in an aqueous acid in the presence of a fluoride complexing agent to produce an aqueous uranium solution,
   (b) adjusting the aqueous uranium solution of step (a) to a pH between about 1 to about 3,
   (c) reacting the aqueous uranium solution of step (b) with peroxide to precipitate uranium (VI) peroxide hydrate, and
   (d) separating the precipitated uranium (VI) peroxide hydrate of step (c).

15. A method according to claim 14 wherein the aqueous acid is nitric acid.

16. A method according to claim 14 wherein the fluoride complexing agent is an aluminum compound.

17. A method according to claim 14 wherein said peroxide is hydrogen peroxide.

18. A method according to claim 14 including maintaining the aqueous uranium solution at a pH between about 1 to about 3 during the reaction of step (c).

19. A method according to claim 14 including filtering said aqueous uranium solution of step (a) to remove undissolved material prior to adjusting the pH of said solution in step (b).

20. A method according to claim 14 including filtering said aqueous uranium solution of step (b) to remove undissolved material prior to reacting said solution in step (c).

21. A method according to claim 20 including maintaining the aqueous uranium solution at a pH between about 1 to about 3 during said filtration.

22. A method of preparing uranium (VI) peroxide hydrate from uranium tetrafluoride hydrate, comprising the steps of:
   (a) digesting an impure uranium-containing compound in nitric acid in the presence of a fluoride precipitating agent to precipitate fluoride ions and produce an aqueous uranium solution, wherein said uranium-containing compound consists essentially of uranium tetrafluoride hydrate;
   (b) filtering the aqueous uranium solution of step (a) to remove precipitated fluorides and undissolved material;
   (c) adjusting the aqueous uranium solution of step (b) to a pH between 1 and 3;
   (d) reacting the aqueous uranium solution of step (c) with peroxide to precipitate uranium (VI) peroxide hydrate;
   (e) separating the precipitated uranium (VI) peroxide hydrate of step (d);
   (f) digesting the uranium (VI) peroxide hydrate of step (e) in nitric acid in the presence of a fluoride complexing agent to produce an aqueous uranium solution;
   (g) adjusting the aqueous uranium solution of step (f) to a pH between about 1 to about 3;
   (h) reacting the aqueous uranium solution of step (g) with peroxide to precipitate uranium (VI) peroxide hydrate, and
   (i) separating the precipitated uranium (VI) peroxide hydrate of step (h), whereby a purified uranium (VI) peroxide hydrate containing no more than 0.15% fluoride based on the weight of uranium is produced.

23. A method of preparing uranium (VI) peroxide hydrate from uranium tetrafluoride hydrate, comprising the steps of:
   (a) mixing uranium tetrafluoride hydrate with a calcium compound slurry;
   (b) adding to the mixture of step (a) nitric acid, whereby an aqueous uranium solution is produced and a calcium flouride precipitate is formed;
   (c) adding a stoichiometric amount of sulfuric acid to the mixture of step (b) to precipitate excess calcium cations as calcium sulfate;
   (d) filtering the aqueous uranium solution of step (c) to remove precipitates and undissolved material;
   (e) adjusting the aqueous uranium solution of step (d) to a pH between about 1 to about 3;
   (f) reacting the aqueous uranium solution of step (e) with peroxide to precipitate uranium (VI) peroxide hydrate, and
   (g) separating the precipitated uranium (VI) peroxide hydrate of step (f).

24. A method of preparing a purified uranium (VI) peroxide hydrate from phosphate rock, said method comprising the steps of:
   (a) treating phosphate rock with sulfuric acid, whereby calcium sulfate is precipitated and phosphoric acid containing dissolved uranium is released;
   (b) extracting uranium from said phosphoric acid with a solvent which is immiscible with water and which has a high affinity for uranium;
   (c) separating the uranium-laden solvent of step (b) from said phosphoric acid;
   (d) contacting said uranium-laden solvent of step (c) with hydrofluoric acid to precipitate the uranium in the form of impure uranium tetrafluoride hydrate;
   (e) digesting said impure uranium tetrafluoride hydrate of step (d) in nitric acid in the presence of a fluoride precipitating agent to precipitate fluoride ions and produce an aqueous uranium solution;
   (f) filtering the aqueous uranium solution of step (e) to remove precipitated fluorides and undissolved material;
   (g) adjusting the aqueous uranium solution of step (f) to a pH between 1 and 3;
   (h) reacting the aqueous uranium solution of step (g) with peroxide to precipitate uranium (VI) peroxide hydrate;
   (i) separating the precipitated uranium (VI) peroxide hydrate of step (h);
   (j) digesting the uranium (VI) peroxide hydrate of step (i) in nitric acid in the presence of a fluoride complexing agent to produce an aqueous uranium solution;
   (k) adjusting the aqueous uranium solution of step (j) to a pH between about 1 to about 3;
   (l) reacting the aqueous uranium solution of step (k) with peroxide to precipitate uranium (VI) peroxide hydrate; and
   (m) separating the precipitated uranium (VI) peroxide hydrate of step (l), whereby a purified uranium (VI) peroxide hydrate containing no more than 0.15% fluoride based on the weight of uranium is produced.

* * * * *